United States Patent [19]
Meijer

[11] 3,993,983
[45] Nov. 23, 1976

[54] APPARATUS FOR SENSING VARIATIONS IN THE HEAT EXCHANGE PROPERTIES OF A MEDIUM

[75] Inventor: Robert S. Meijer, Montreal, Canada

[73] Assignee: Multi-State Devices Ltd., Dorval, Canada

[22] Filed: June 9, 1975

[21] Appl. No.: 585,444

[52] U.S. Cl. .......................... 340/239 R; 307/118; 307/310; 340/227 D; 340/228 R
[51] Int. Cl.² ........................................ G08B 21/00
[58] Field of Search ........ 340/239 R, 244 C, 244 R, 340/228 R, 227 D; 307/118, 310; 317/198.5 B, DIG. 1, DIG. 3

[56] References Cited
UNITED STATES PATENTS

| | | | |
|---|---|---|---|
| 3,343,004 | 9/1967 | Ovshinsky | 307/310 |
| 3,766,395 | 10/1973 | Keir | 340/244 R |
| 3,781,839 | 12/1973 | Bodge | 340/239 R |
| 3,878,541 | 4/1975 | Dodson | 340/228 R |
| 3,882,728 | 5/1975 | Wittlinger | 307/310 |

*Primary Examiner*—Glen R. Swann, III
*Attorney, Agent, or Firm*—Spencer & Kaye

[57] ABSTRACT

The apparatus includes two temperature sensitive switching devices having substantially identical electrical characteristics and exhibiting regenerative switching at a power level which is dependent on the temperature sensed by the switching devices. Both switching devices are exposed to the same ambient temperature in a surrounding medium but only one of them is exposed to variations in the heat exchange properties of the surrounding medium. Means are provided for applying D.C. power to both switching devices at a level such as to maintain them below their switching point under preset conditions of the medium. A coupling device is interconnected between the two switching devices for inducing regenerative switching in one of the switching devices in response to unbalance in the heat dissipated by the switching devices due to variations in the heat exchange properties of the surrounding medium from the preset conditions. A monitoring device is connected to both switching devices for indicating that one of the switching devices has switched as an indication that the heat exchange properties of the medium have changed.

5 Claims, 3 Drawing Figures

APPARATUS FOR SENSING VARIATIONS IN THE HEAT EXCHANGE PROPERTIES OF A MEDIUM

BACKGROUND OF THE INVENTION

This invention relates to an apparatus for sensing variations in the heat exchange properties of a medium, and more particularly to an apparatus for sensing variations in the flow of a fluid medium such as air or liquid, or for sensing the presence or absence of a liquid as an indication of the level of the liquid in a reservoir.

Various devices have been used in the prior art for sensing variations in the flow of a fluid medium or for sensing liquid level. For sensing fluid flow, for example, various mechanical impact devices have been used. However, they present substantial interference with the fluid flow. Generally, the mechanical devices whether used for sensing fluid flow or for fluid level detection have poor response characteristics and cannot sense relatively small variations in the heat exchange properties of the surrounding medium. They are also susceptible to nuisance operations and subject to wear.

Negative and positive temperature coefficient devices have also been used for sensing variations in the heat exchange properties of a medium. Such devices are normally placed in contact with the medium and the temperature sensed by the devices varies in accordance with the rate at which the medium is drawing heat away from them. Negative and positive temperature coefficient devices can thus be used for measuring fluid flow or for sensing fluid levels. The above prior art arrangements are, however, very sensitive to ambient temperature and power supply variations and means are required for providing adequate compensation. Ambient temperature compensation may be effected by providing a bridge circuit including a second temperature sensitive device which is exposed to ambient temperature but not in contact with the surrounding medium, as disclosed in Canadian Pat. No. 582,848 issued Sept. 8, 1959. However, bridge circuits generally have a very small output which cannot be used directly to control an alarm device and complicated circuitry must be used to amplify the output of the bridge.

SUMMARY OF THE INVENTION

It is therefore the object of the present invention to provide an apparatus for sensing variations in the heat exchange properties of a medium which is relatively immune to temperature and power supply variations.

It is also an object of the present invention to provide an apparatus for sensing variations in the heat exchange properties of a medium which exhibits a rapid and significant change in its output upon a predetermined change in the heat exchange properties of the medium, thus providing an adequate signal for directly operating a single monitoring device.

The apparatus, in accordance with the invention, comprises a first and a second temperature sensitive switching devices having substantially identical electrical characteristics and exhibiting regenerative switching at a power level which is dependent on the temperature sensed by the switching devices. Both switching devices are exposed to the same ambient temperature in a surrounding medium but only one of them is exposed to variations in the heat exchange properties of the surrounding medium. Means are provided for applying D.C. power to both switching devices at a level such as to maintain them below their switching point under preset conditions of the medium. A coupling device is interconnected between the first and second switching devices for rapidly inducing regenerative switching in one of the switching devices in response to unbalance of the heat dissipated by the switching devices due to variations in the heat exchange properties of the surrounding medium from the preset conditions. A monitoring device is connected to the first and second switching devices for indicating which one of the switching devices has switched.

In one embodiment of the invention, a resistor is connected in series with each temperature sensitive switching device and the amplitude of the D.C. source and the value of the resistors are selected so as to maintain both switching devices below their switching point under preset conditions of the medium.

In one embodiment of the invention, the coupling device interconnected between the switching devices to induce regenerative switching is a transistor having its base and emitter connected respectively between the first and second switching devices. A pilot light is connected to the collector of the transistor and acts as a monitoring device to indicate variations in the heat exchange properties of the surrounding medium. In another embodiment of the invention, a triac connected in series with a pilot light is used as monitoring device. In such a case, the gate of the triac is connected to the collector of the transistor.

BRIEF DESCRIPTION OF THE DRAWINGS

The invention will now be disclosed, by way of examples, with reference to preferred embodiments illustrated in the accompanying drawings in which.

DETAILED DESCRIPTION OF THE PREFERRED EMBODIMENTS

Figure 1:
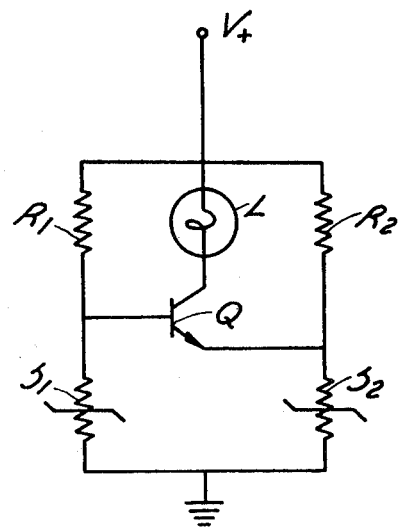
FIG. 1 illustrates a first embodiment of the invention.

Referring to FIG. 1, there is shown a first embodiment of an apparatus for sensing variations in the heat exchange properties of a medium. Such apparatus is for sensing air flow and, more particularly for detecting failure of an air flow source such as a fan. The apparatus comprises a first temperature sensitive switching device $S_1$ connected in series with a resistor $R_1$ across a suitable D.C. source $V_+$, a second temperature sensitive switching device $S_2$ having substantially the same electrical characteristic as the first switching device $S_1$ connected in series with a resistor $R_2$ across the same D.C. source, a coupling device in the form of a transistor Q interconnecting the switching devices $S_1$ and $S_2$ and a monitoring device in the form of a pilot light L connected to transistor Q. As illustrated in FIG. 1, the base of transistor Q is connected to the connecting point of resistor $R_1$ with temperature sensitive switching device $S_1$, the emitter of transistor Q is connected to the connecting point of resistor $R_2$ with temperature sensitive switching device $S_2$, and the collector of transistor Q is connected to the D.C. source $V_+$ through pilot light L.

The temperature sensitive switching device must show regenerative switching at a value of voltage which is dependent on temperature. Examples of suitable switching devices are the amorphous glass devices, transition metal oxide devices (see for example, U.S. Pat. No. 3,402,131, issued Sept. 17, 1968), and certain classes of negative temperature switching devices. In most cases, elevated temperatures correspond to a reduction in the voltage threshold necessary to cause switching. The expression "regenerative switching devices" as used herein means devices exhibiting avalance behaviour due to their very high negative temperature coefficient of resistance. As commonly known, most thermal avalanche behaviour is due to a current crowding effect in which current crowding leads to local heating in the device which in turn leads to further current crowding. On completion of this process, most of the device current flows through a very narrow filament in the device. Because of the relatively low resistance of the conducting material, total device resistance becomes quite low. Such devices therefore behave like switches and go from a high resistance to a low resistance state in a very short period of time. The basic switching mechanism of the temperature dependent regenerative switching devices is usually thermal and occurs in response to both Joule heating and the ambient thermal energy. In most cases, switching action is observed when the sum of all energies yields a given temperature at the switching element. In other words, whatever the source of heat, the switching device always switches at an essentially fixed temperature.

Figure 2:
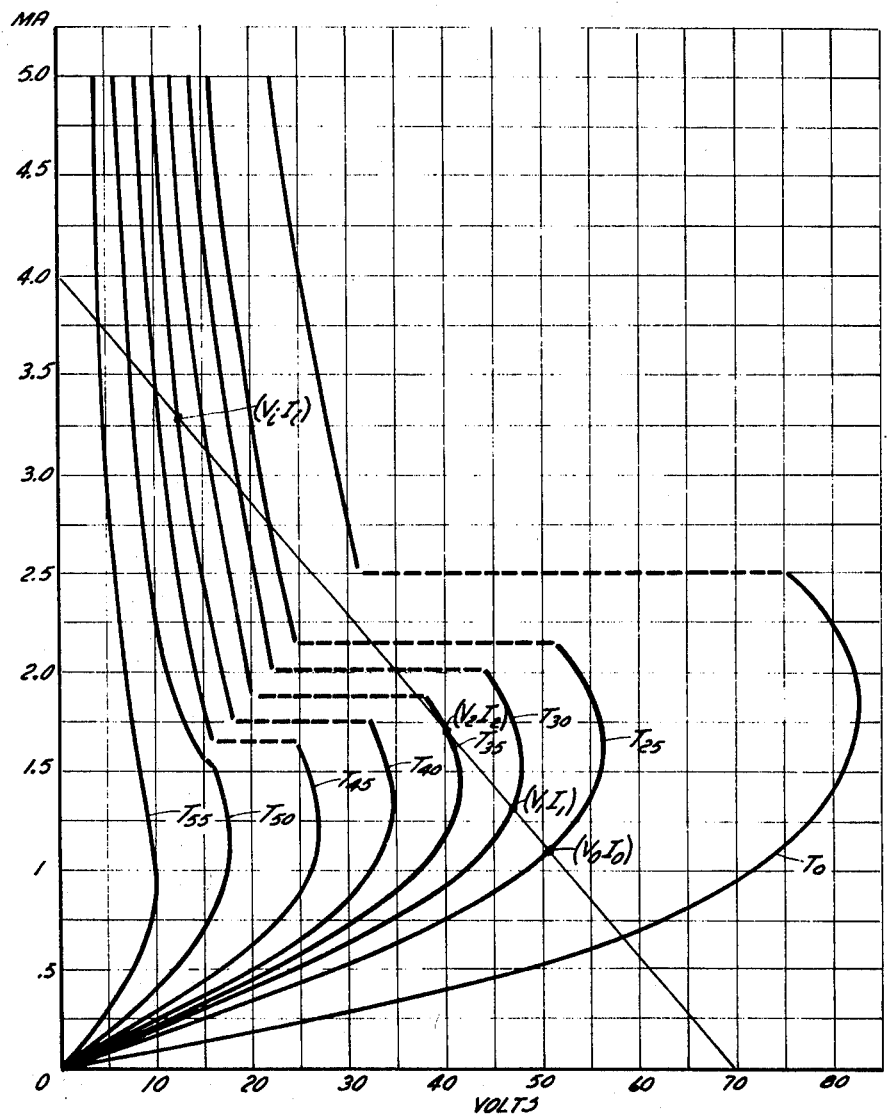
FIG. 2 illustrates the temperature dependent current-voltage characteristics of a vanadium oxide device suitable for use as a temperature sensitive switching device.

FIG. 2 of the drawings shows the temperature dependent current-voltage characteristics of a vanadium dioxide device which is well suited for the present invention. It will be seen that the current-voltage characteristics of such temperature dependent switching devices follow curves $T_0$, $T_{25}$, $T_{30}$, etc. depending on whether the temperature sensed by the switching device is 0°, 25°, 30°, etc.

In order to detect a change in the heat exchange properties of a medium, both temperature sensitive switching devices must be exposed to the same ambient temperature in the medium being monitored. However, one switching device only is exposed to variations in the heat exchange properties of the medium. In a device such as an air flow sensor, as shown on FIG. 1, both switching devices may be exposed to a stream of moving air and switching device $S_1$ placed in a heat sink so as to render it non-responsive to reduction or loss of air flow. Under predetermined ambient temperature, with the fan blowing at a preset speed, the amplitude of the D.C. source and the value of resistors $R_1$ and $R_2$ are set so that not enough current flows through the temperature sensitive switching devices $S_1$ and $S_2$ to make them switch. It is assumed that the load line determined by the parameters of the circuit is as illustrated in FIG. 2 and that the operating point is $V_0I_0$. It is also assumed that the relative values of the circuit parameters are such that there is not enough voltage across the base-emitter of the transistor Q to render the transistor conductive. However, upon a substantial reduction or loss of air flow, the temperature sensitive switching device $S_2$ will heat up whereas the temperature sensitive switching device $S_1$ will not warm up appreciably because it is placed in a heat sink. Consequently, as illustrated by the load line of FIG. 2, the voltage appearing across the switching device $S_2$ will be reduced so that the new operating point will be say $V_1I_1$. A current will therefore start to flow from source $V_+$, resistor $R_1$, baseemitter of transistor Q and temperature sensitive switching device $S_2$. This current will further heat the temperature sensitive switching device $S_2$ and the operating point will move to say $V_2I_2$. This will turn the transistor Q more conductive and so on thus causing rapid regenerative switching of temperature sensitive switching device $S_2$ and stabilization thereof at a point which we assume is $V_iI_i$. The full condition of transistor Q will energize pilot light L to indicate substantial reduction or loss of air flow.

Although the above apparatus has been disclosed with reference to detection of air flow, it is to be understood that it may also be used for detection of a flow of liquid or even for liquid level sensing. In the later case, temperature sensitive switching devices $S_1$ and $S_2$ are normally placed in contact with the liquid medium when the level of the liquid in a reservoir is at a predetermined height. However, if this level falls, the temperature sensitive switching devices will be out of the liquid and exposed to the ambient air. The rate of heat removal from the switching device which is exposed to the variations in the heat exchange properties of the surrounding medium will certainly change because air does not have the same heat exchange properties as liquid and switching device $S_2$ will heat up and finally switch as explained previously.

Figure 3:
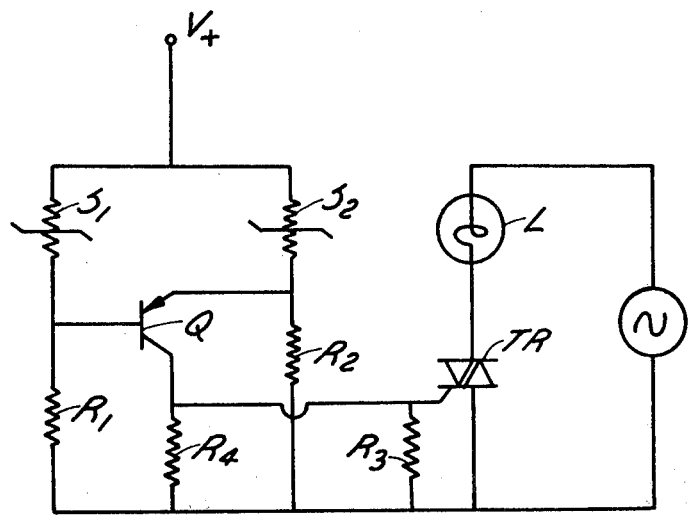
FIG. 3 illustrates a second embodiment of an apparatus in accordance with the invention.

FIG. 3 illustrates an apparatus very similar to the one illustrated in FIG. 1 and the elements corresponding to the ones of FIG. 1 have been identified by the same reference characters. In this embodiment, the monitoring device consists of a triac TR connected in series with a pilot light across an A.C. source. The triac is fired by a gate circuit including resistor $R_3$ which is connected across resistor $R_4$ located in the collector circuit of transistor Q.

The above disclosed apparatus is binary in operation and is intended primarily for application where simple go no-go sensing is required. The basic advantages of such apparatus are:

1. It inherently has regenerative switching and thus exhibits rapid switching. As soon as a small unbalance in the heat dissipated by the temperature sensitive switching devices is sensed, an avalanche type regenerative switching action is generated so as to quickly reduce the voltage across one of the temperature sensitive switching devices and provide a positive indication of the change in the heat exchange properties of the medium being monitored.

2. It is insensitive to ambient temperature and supply voltage variations. Indeed, both temperature sensitive devices are exposed to ambient temperature and power supply variations so that such variations cancelled each other. The above disclosed apparatus is also made of small switching devices which present very little interference with the air flow, have relatively low power consumption, work at low operating temperature, have a high sensitivity to air flow and are also very inexpensive.

Although the above invention has been disclosed we reference to preferred embodiments thereof, it is to be understood that various modifications may be made to such apparatus within the scope of the claims and the spirit of the invention. For example, the coupling device may be any bidirectional or unidirectional conducting element and is not limited to a transistor as disclosed in the present embodiment. When using a bidirectional conducting element, regenerative switching may be induced in any one of the switching devices in response to unbalance in the heat dissipated by the switching devices. Consequently, using the circuit of FIG. 1, an increase in fluid flow could be sensed. Indeed, such would cool switching device $S_2$ and raise the potential across switching device $S_2$. This would in turn cause a current flow from source $V_+$ through resistor $R_2$, the coupling resistor, and switching device $S_1$. Such an additional current would heat switching device $S_1$ and cause its regenerative switching.

Any type of temperature sensitive switching devices which exhibit regenerative switching at a power level which is dependent on the temperature sensed may also be used. Furthermore, any type of monitoring devices can be utilized for sensing regenerative switching of any one of the switching devices.

What is claimed is:

1. Apparatus for sensing variations in the heat exchange properties of a medium comprising:
   a. first and second temperature sensitive switching devices having substantially identical electrical characteristics and exhibiting regenerative switching at a power level which is dependent on the temperature sensed by said switching devices, both said switching devices being exposed to the same ambient temperature in a surrounding medium but only one of them being exposed to variations in the heat exchange properties of the surrounding medium;
   b. means for applying D.C. power to both said switching devices at a level such as to maintain them below their switching point under preset conditions of the medium;
   c. a coupling device interconnecting said first and second switching device for rapidly inducing regenerative switching action in one of the switching devices in response to unbalance in the heat dissipated by the switching devices due to variations in the heat exchange properties of the surrounding medium from said preset conditions; and
   d. a monitoring device, connected to said coupling device, for indicating that one of said switching devices has switched as an indication that the heat exchange properties of the medium have changed.

2. Apparatus as defined in claim 1, wherein each said switching device is connected in series with a respective resistor, and wherein the level of the D.C. power and the value of each resistor are selected so as to maintain the switching devices below their switching point under said preset conditions.

3. Apparatus as defined in claim 1, wherein said coupling means is a transistor having a base, an emitter and a collector, said transistor having its base and emitter connected respectively to said first and second switching devices and its collector connected to said monitoring device.

4. Apparatus as defined in claim 3, wherein said monitoring device is a pilot lamp connected in series with said collector of said transistor.

5. Apparatus as defined in claim 3, wherein said monitoring device is a triac connected in series with a pilot light across an A.C. source, said triac having a gate connected to said collector of said transistor.

* * * * *